(12) United States Patent
Hatjasalo et al.

(10) Patent No.: US 6,890,475 B1
(45) Date of Patent: May 10, 2005

(54) METHOD AND APPARATUS FOR MANUFACTURING A THIN-WALLED ARTICLE

(75) Inventors: Leo Hatjasalo, Helsinki (FI); Jarkko Valtanen, Helsinki (FI)

(73) Assignee: Oy OMS Optomedical Systems Ltd. (FI)

( * ) Notice: Subject to any disclaimer, the term of this patent is extended or adjusted under 35 U.S.C. 154(b) by 0 days.

(21) Appl. No.: 09/700,372

(22) PCT Filed: Apr. 28, 1999

(86) PCT No.: PCT/FI99/00342

§ 371 (c)(1),
(2), (4) Date: Nov. 15, 2000

(87) PCT Pub. No.: WO99/59736

PCT Pub. Date: Nov. 25, 1999

(30) Foreign Application Priority Data

May 15, 1998 (FI) .................................... 981083

(51) Int. Cl.[7] .............................................. B29C 41/08
(52) U.S. Cl. ........................ 264/439; 264/255; 264/309; 264/484; 425/174.8 E; 118/625; 118/628
(58) Field of Search ................................. 264/439, 403, 264/309, 484; 425/174.8 E; 118/621, 625, 629

(56) References Cited

U.S. PATENT DOCUMENTS

| 2,269,513 | A | * | 9/1942 | Gavatin et al. ............... 264/81 |
|---|---|---|---|---|
| 2,393,298 | A | * | 1/1946 | De Laney et al. ............... 2/168 |
| 2,425,652 | A | * | 8/1947 | Starkey ....................... 427/477 |
| 2,551,035 | A | * | 5/1951 | Miller ......................... 204/165 |
| 3,607,998 | A | * | 9/1971 | Goodridge ................... 264/439 |
| 3,635,401 | A | * | 1/1972 | Bromley et al. ............. 239/705 |
| 3,930,061 | A |   | 12/1975 | Scharfenberger ............. 427/27 |
| 3,976,031 | A | * | 8/1976 | Itoh ............................ 118/629 |
| 4,055,550 | A | * | 10/1977 | Panadiker et al. ............. 528/45 |
| 5,149,563 | A | * | 9/1992 | Colier ......................... 427/27 |

FOREIGN PATENT DOCUMENTS

| EP | 0 541 230 A2 | 5/1993 |
| EP | 0 623 782 A2 | 11/1994 |
| WO | WO 98/25747 | * 6/1998 |

* cited by examiner

*Primary Examiner*—Stefan Staicovici
(74) *Attorney, Agent, or Firm*—Connolly, Bove, Lodge & Hutz LLP

(57) ABSTRACT

The invention relates to a method for manufacturing a thin-walled article, wherein a single- or multi-component, essentially polymer-based material (1), such as plastics, elastomers, and/or the like, is sprayed in an elecrical field (E) in an electrically charged state. The thin-walled article is manufactured in the electrical field (E) by spraying (II) an electrically charged material into the contact with a mould (2) set at an electric potential, after which spraying cycle (II) the article is, at least in terms of its appearance, immediately a finished product after its demoulding/releasing from the mould (2). The invention relates also to an apparatus operating in accordance with the method.

15 Claims, 2 Drawing Sheets

METHOD AND APPARATUS FOR MANUFACTURING A THIN-WALLED ARTICLE

Figure 1:
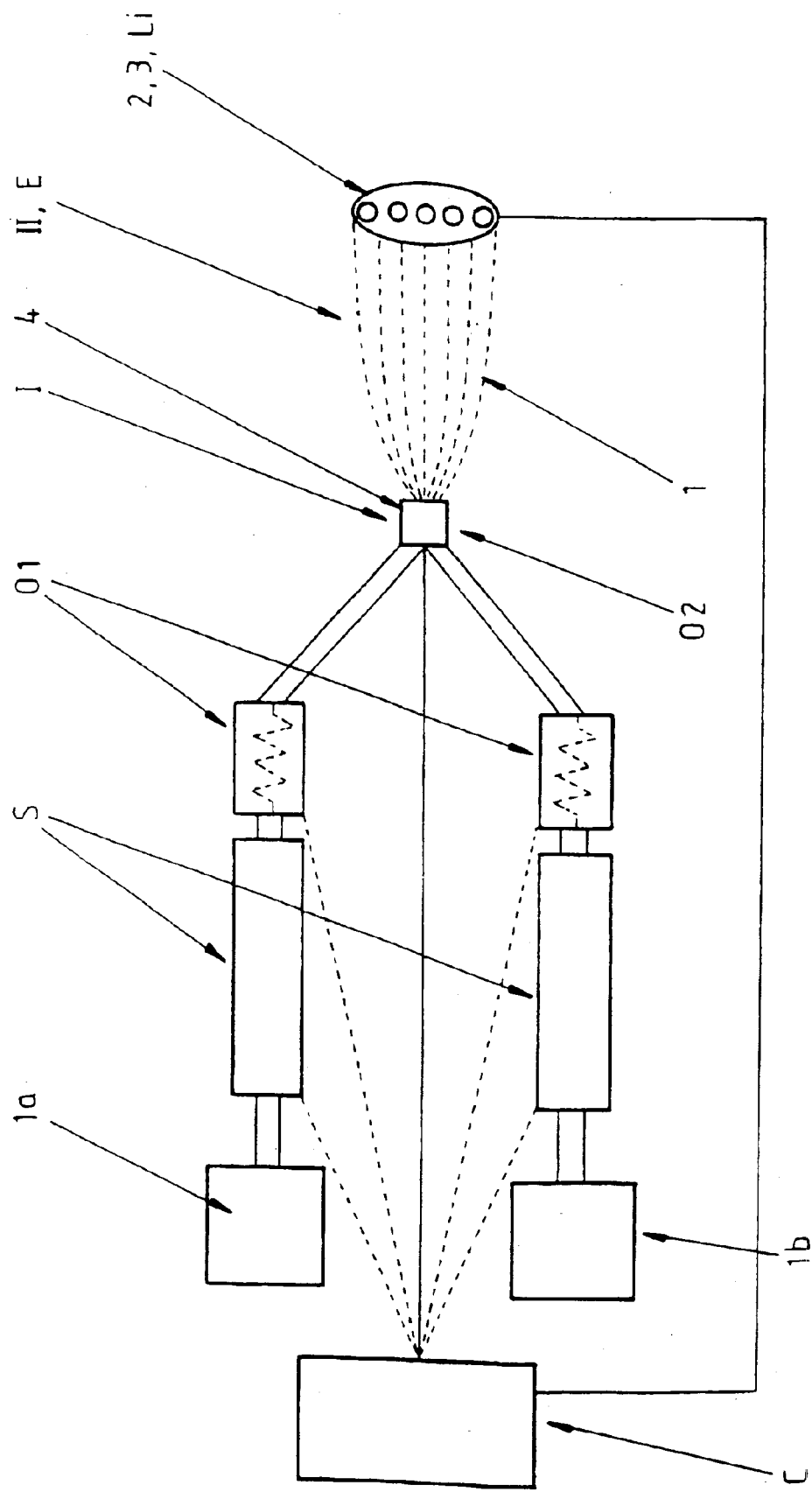

The present invention relates to a method for manufacturing a thin-walled article, wherein a single- or multi-component, essentially polymer-based material, such as plastics, elastomers, and/or the like, is sprayed in an electrical field in an electrically charged state.

At present, it is conventional to employ so-called electrostatic coating e.g. in automotive painting. This application is generally carried out by using metal-based coating materials, whose electrical charge and spraying in an electrical field can be achieved in the discussed application in a sufficiently homogeneous manner, such that the automobile is provided all over with a sufficiently thick layer of paint. However, the above type processing is inconvenient to carry out in practice with a sufficient reliability, especially when used in connection with plastic-based materials because of a poor applicability of this type of materials to the discussed processing. On the other hand, it is perfectly well known to provide the plastics to be sprayed with an electrical charge by using suitable polarity/resistivity regulating materials, such as chlorine-/glycol-based materials or the like. Despite this, however, this type of electrical processing of a plastic material has not been possible to perform thus far with a sufficient reliability, which is why e.g. conventional thin-walled ordinary articles, such as gloves, condoms or the like, must still be manufactured largely by using a traditional dip process.

On the other hand, the International patent publication WO 94/22594 discloses a process for coating especially objects with varying shapes, which is based on the fact that a multi-component material, one comprising a cold curing and inert, e.g. solvent-free resin, is electrostatically applied to a surface of an object, whereafter at least one fluid material is. sprayed onto the resin before it has cured.

The cited publication does not present any concrete solution for performing the above-described task, as it mostly discloses various alternative working principles for providing a coating. On the basis of technology described in the cited publication, it is not possible in practice to make sure that especially a flow of resin-based, electrically processible material be applied particularly to a multi-dimensionally shaped article in such a way that the direct result of a spraying cycle would be a finished end product immediately after its removal from the mould or that each area/point of the article would be provided with an exactly desired material thickness, which hence remains to be a central problem, especially in terms of electrically processing plastic-based materials.

An object of this intention is to provide a decisive remedy for the above-described problems and hence to raise substantially the available prior art. In order to achieve this object, a method of the invention is principally characterized in, that the thin-walled article is manufactured in an electrical field by spraying an electrically charged material into the contact with a mould set at an electric potential, after which spraying cycle the article is, at least in terms of its appearance, immediately a finished product after its removal/separation from the mould.

The method of the invention offers some major advantages, including e.g. its technical functionality and applicability, by virtue of which it is practically for the first time possible to provide a sufficiently reliable result in most diversified applications, even when using a plastic-based manufacturing material in connection with the above type of electrical processing. Usefulness of the method is based on the fact that, in principle, a single spraying cycle is sufficient for manufacturing even a completely finished end product, which does not necessarily require any finishing operations when using properly blended process materials, regarding e.g. colouring or other mechanical/physical characteristics, such as surface tension, surface strength, colouring, or the like. When applying the method of the invention in a preferred fashion, it is also possible to manufacture articles, whose wall thickness is intentionally made in certain areas different from other areas. Furthermore, the method of the invention can be applied in a traditional manner, e.g. in a so-called electrostatic fashion, such that, according to an application preferably utilized in the method, the predetermined voltage levels in the various treatment blocks of a mould included therein are maintained substantially constant through the entire spraying cycle. On the other hand, it is also possible in this connection to utilize a dynamically controlled spraying process, such that one or more process parameters are changed continuously or periodically and/or that the mould is moved during the spraying cycle.

Preferred applications for the method of the invention are set forth in the non-independent claims directed to a method.

The invention relates also to an apparatus operating in accordance with the method, which is defined in more detail in the preamble of the independent claim directed to the same. The principally characterizing features of the apparatus are set forth in the characterizing clause of said claim.

The most important advantages offered by the apparatus of the invention include technical reliability in its operation and function. Another advantage offered by the apparatus of the invention is that a mould included therein, which is removable/separable from an article to be manufactured and which is either negative and/or positive, depending on a given article to be manufactured, renders it possible to manufacture most diverse products. In a preferred embodiment of the apparatus, it is also possible to utilize treatment blocks, included in the mould and to be set at voltage levels different from each other, the voltage levels mathematically predetermined therein effecting in the actual spraying process a totally controlled flow of material to the wall of a given target being treated/manufactured, e.g. for enabling the very above-mentioned fluctuations in material thickness. Depending on an article to be processed, it is also possible to provide the apparatus with a control unit, operating in principle e.g. according to a traditional, i.e. e.g. in a so-called electrostatic manner, such that the predetermined voltage levels in the treatment blocks of a mould are substantially constant through the entire spraying cycle. On the other hand, it is also possible to make said control unit dynamical, such that certain process parameters are changed continuously or with an on/off principle during the spraying cycle.

Preferred embodiments for the apparatus of the invention are set forth in the non-independent claims directed to an apparatus.

Figure 2:
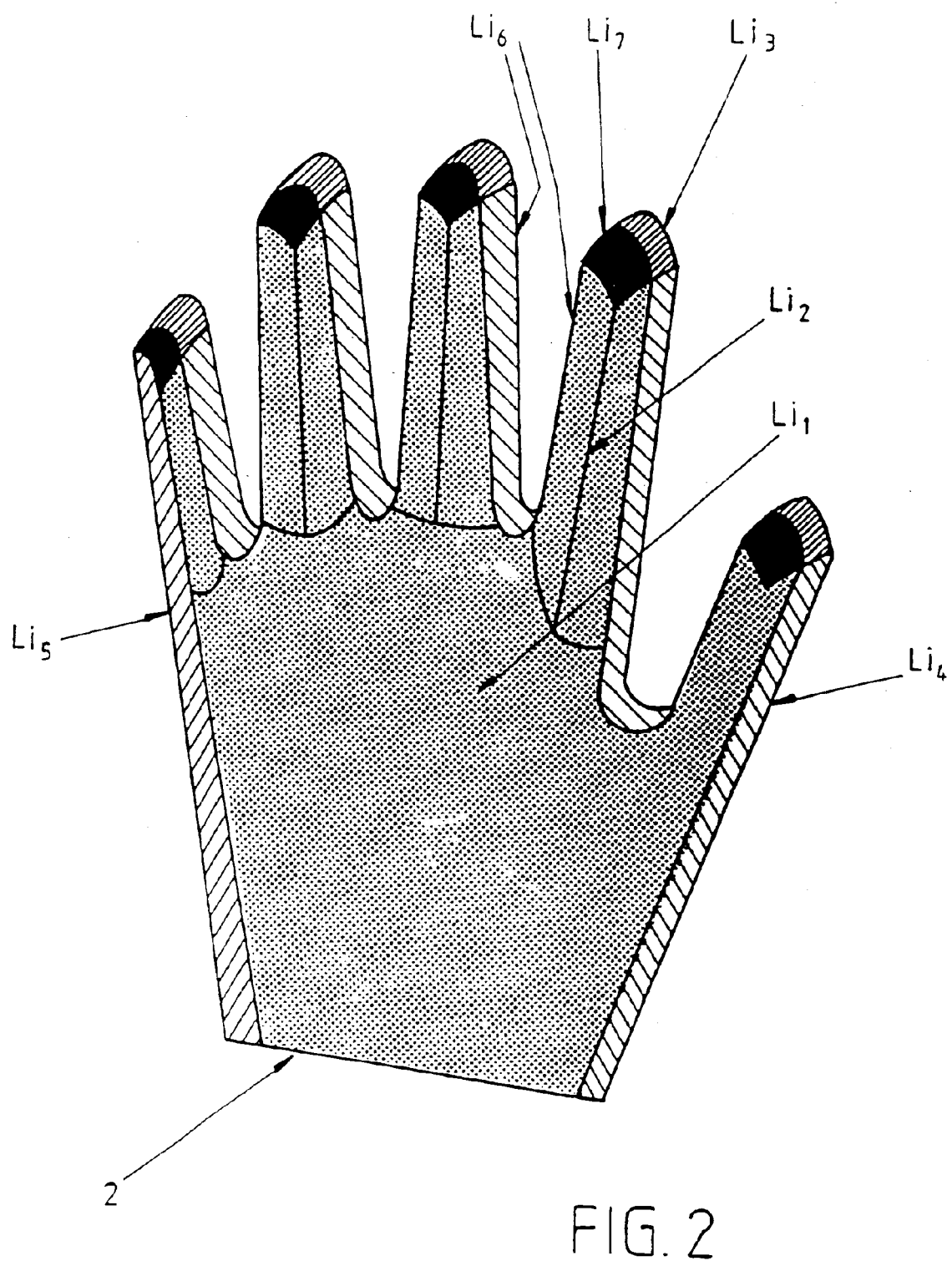

In the following specification, the invention will be described in more detail with reference made to the accompanying drawings, in which FIG. 1 shows the operating principle for a method and an apparatus of the invention, and FIG. 2 shows by way of example a mould useful in connection with a method and an apparatus of the invention.

The invention relates to a method for manufacturing a thin-walled article, wherein a single- or multi-component, essentially polymer-based material 1, such as plastics, elastomers, and/or the like, is sprayed in an elecrical field E in an electrically charged state. The thin-walled article is manufactured in the electrical field E by spraying II an electrically charged I material into the contact with a mould 2 set at an electric potential, after which spraying cycle II the article is, at least in terms of its appearance, immediately a finished product after its removal/separation from the mould 2.

In a further preferred application of the method, a three-dimensional, thin-walled article is manufactured by spraying a manufacturing material in the electrical field E to an open mould 2 set at an electric potential. In yet another preferred application of the method, the surface of said mould 2 is treated with surface-tension regulating surfactants, such as a polyolefine-based and/or a corresponding agent, especially for facilitating the removal/separation of a finished article from the mould 2. In a further preferred application, the surface tension of a material to be sprayed is adjusted relative to the surface tension of a mould to a level that results in a uniform, thin material thickness.

Furthermore, in a preferred application of the method, said method is used for manufacturing an elastic product, such as a garment, a condom, or e.g. a glove just as shown in FIG. 2, by spraying II the manufacturing material 1 in the electrical field E to the open mould 2 set at an electric potential.

In still another preferred application of the method, especially in reference to the operating principle depicted in FIG. 1, the manufacturing material 1 is heated by the action of a heating unit 01, whereafter ingredients 1a, 1b of the multi-component manufacturing material are mixed together 02, the manufacturing material 1 is charged electrically I and sprayed II by the action of a processing unit 4, such as a spray bell or the like.

In a preferred application, a desired wall thickness for the article to be manufactured is achieved at any given point by providing the mould 2 with two or more treatment blocks Li, which can be set at voltage levels substantially different from each other, e.g. by applying the principle shown in FIG. 2.

In yet another preferred application of the method, the article is manufactured by using two or more processing units 4, essentially facing each other, by moving the mould 2 in the spraying situation II, and/or by changing, during the spraying cycle II, one or more process parameters, such as the volume flow, viscosity and/or the like of a manufacturing material or a component thereof, and/or the electrical field E, such as the voltage level in one or more treatment blocks Li of the mould.

First of all, the above type application of the method is based on the fact that a given target to be processed, e.g. a glove as just depicted in FIG. 2, is previously modelled and this is used as a basis for determining calculated or so-called tabulated optimal voltage levels for each critical point/area of a target, such that the unequal voltage levels established in these areas serve either to boost or suppress the electrical field during the actual spraying II for a controlled management of the flows of material. The discussed mould can be quite simply assembled by using of wires or the like electrically conducting surfaces appropriately included in each treatment block.

The apparatus operating in accordance with the above described method comprises, unlike the traditional solutions, especially a mould 2 which can be set at an electric potential and which is removable/separable from an article that is formed after spraying II an electrically charged flow of material to the mould 2 and that is a finished product at least in terms of its appearance.

Particularly in reference to the basic operating sketch shown in FIG. 1, the apparatus comprises a heating unit 01 intended for heating basic ingredients 1a, 1b pressurized by means of cylinders S, and a processing unit 4, such as a spray bell or the like, for mixing 02 said ingredients together, for charging the same electrically I, and for producing a material spray II from the prepared manufacturing material 1.

In a preferred embodiment, the apparatus comprises a mould 2, including two or more treatment blocks Li, for example, $L_1$, $L_2$, $L_3$, $L_4$, $L_5$ and $L_6$ shown in FIG. 2, whose voltage levels can be set to essentially differ from each other, and/or a control unit c for changing, during the spraying cycle II, one or more process parameters, such as the volume flow, viscosity, and/or the like of a manufacturing material or a component thereof, and/or the electrical field E, such as the voltage level in one or more treatment blocks Li of the mould 2.

It is obvious that the invention is not limited to the above-described or explained applications, but it can be subjected to major modifications within the scope of the basic inventional concept. Thus, it is naturally clear that the method of the invention can be utilized in a type of operation discussed in more detail in the Applicant's co-pending patent application "Method and apparatus for electrically controlling a flow of material". Moreover, it is naturally obvious that the method and apparatus of the invention can be used for manufacturing rigid three-dimensional articles as well as naturally also similar elastic products. In practical processing, the voltage level of the apparatus can be chosen to serve any given purpose the best possible way but, in principle, the type of equipment tested by the Applicant with a maximum voltage of about 100 kV is capable of achieving a sufficiently good end result in a wide variety of processes.

What is claimed is:

1. A method for manufacturing an article, comprising:
providing a three-dimensional mould and a control unit to enable at least adjustment of a voltage level of one or more treatment blocks of the mould;
providing a multi-component polymer-based material;
individually heating components of the multi-component polymer-based material with a heating unit;
mixing the components together and spraying the multi-component polymer-based material in an electrically charged state into an electrical field onto the mould with a single-spray processing unit to form a coating on the mould, wherein the mould is not grounded, and wherein mixing of the components and spraying of the multi-component polymer-based material are carried out simultaneously; and
removing the article from the mould following sufficient curing of the coating.

2. A method as set forth in claim 1, further comprising treating a surface of said mould with one or more surface-tension regulating surfactants selected from a group consisting of a silicon-based, a polyolefine-based and a corresponding agent to facilitate demoulding/stripping of the article from the mould, wherein the surface tension of the material is adjusted relative to the surface tension of the mould.

3. A method as set forth in claim 1, wherein the article is an elastic product selected from a piece of clothing a glove, or a condom.

4. A method as set forth in claim 1, wherein a desired wall thickness of the article is achieved at any given point on the surface of the mould by providing the mould with two or more treatment blocks, which are set at voltage levels substantially different from each other.

5. A method as set forth in claim 1, wherein the spraying the polymer-based material comprises one or more changes in process parameters, the process parameters selected from the group consisting of volume flow of the polymer-based material, viscosity of the polymer-based material or a component thereof, and the electrical field.

6. An apparatus for manufacturing a thin-walled article, the apparatus comprising:
two or more reservoirs that contain a polymer-based material that comprises one or more components;
one or more pressurizing units to adjust the pressure of the polymer-based material;
a single-processing unit to electrically charge the polymer-based material and form a spray of electrically charged material onto a three dimensional mould, wherein the mould is not grounded, and wherein the single-processing unit is adapted to simultaneously mix the components, electrically charge the material and spray the material; and
a control unit to adjust at least a voltage level of one or more treatment blocks of the mould.

7. An apparatus as set forth in claim 6, wherein the apparatus further comprises a heating unit to heat the polymer-based material.

8. An apparatus set fort in claim 6 wherein the mould comprises at least two treatment blocks whose voltage levels are independently adjustable.

9. A method as set forth in claim 2, wherein the article is an elastic product selected from a piece of clothing, a glove, or a condom.

10. A method as set forth in claim 2, wherein the material is a multi-component polymer-based material comprising at least two ingredients that are individually heated by a heating unit, mixed together, and charged electrically.

11. A method as set forth in claim 2, wherein a desired wall thickness of the article is achieved at any given point on the surface of the mould by providing the mould with two or more treatment blocks, which are set at voltage levels substantially different from each other.

12. A method as sat forth in claim 3, wherein a desired wall thickness of the article is achieved at any given point on the surface of the mould by providing the mould with two or more treatment blocks, which are set at voltage levels substantially different from each other.

13. A method as set forth in claim 1, wherein a desired wall thickness of the article is achieved at any given point on the surface of the mould by providing the mould with two or more treatment blocks, which are set at voltage levels substantially different from each other.

14. The apparatus of claim 6, wherein the polymer-based material includes at least two components.

15. The apparatus of claim 6, wherein the control unit is adapted to control one or more process parameters selected from the group consisting of volume flow of the polymer-based material, viscosity of the manufacturing material or a component thereof, and the electrical field.

* * * * *